Sept. 1, 1953  W. K. BLEDSOE  2,650,890
LAMINATED GLASS-VINYL WINDSHIELDS
Filed March 8, 1952

INVENTOR.
WILLIAM K. BLEDSOE
BY
*Glenn Orloff*
AGENT

Patented Sept. 1, 1953

2,650,890

UNITED STATES PATENT OFFICE 2,650,890

LAMINATED GLASS-VINYL WINDSHIELDS

William K. Bledsoe, Seattle, Wash., assignor to Boeing Airplane Company, Seattle, Wash., a corporation of Delaware Application March 8, 1952, Serial No. 275,497

4 Claims. (Cl. 154—2.71)

This invention relates to windshields and more particularly to windshields of laminated glass-vinyl secured to the mounting structure in a manner which prevents edge chipping and delamination.

The invention comprises a windshield with an edge construction wherein strips of a parting medium are placed between sheets of vinyl near the boundary of the glass-to-vinyl bond area.

The purpose of this invention is to counteract glass edge chipping tendencies caused by thermal stresses.

An object of the invention is to prevent edge chipping without initiating delamination.

Other objects of the invention will become more apparent as the description is read in conjunction with the drawing wherein the same part is identified by a like numeral throughout the views.

Figure 1:
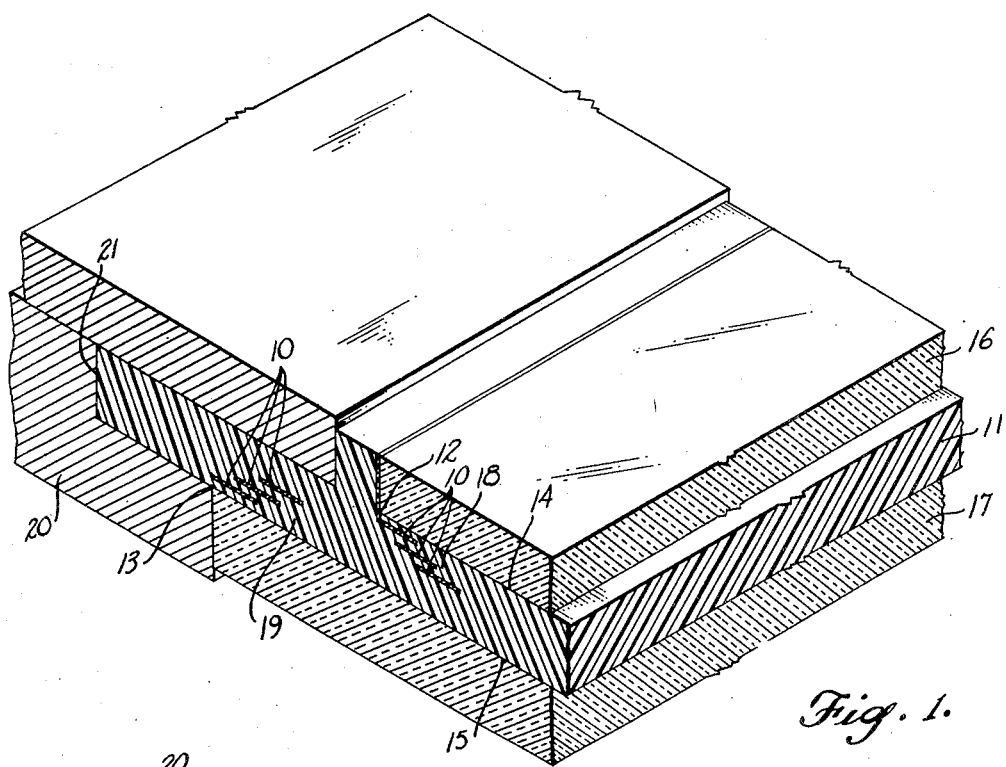
Figure 1 is a perspective view of a section of the windshield and mounting.
Figure 2:
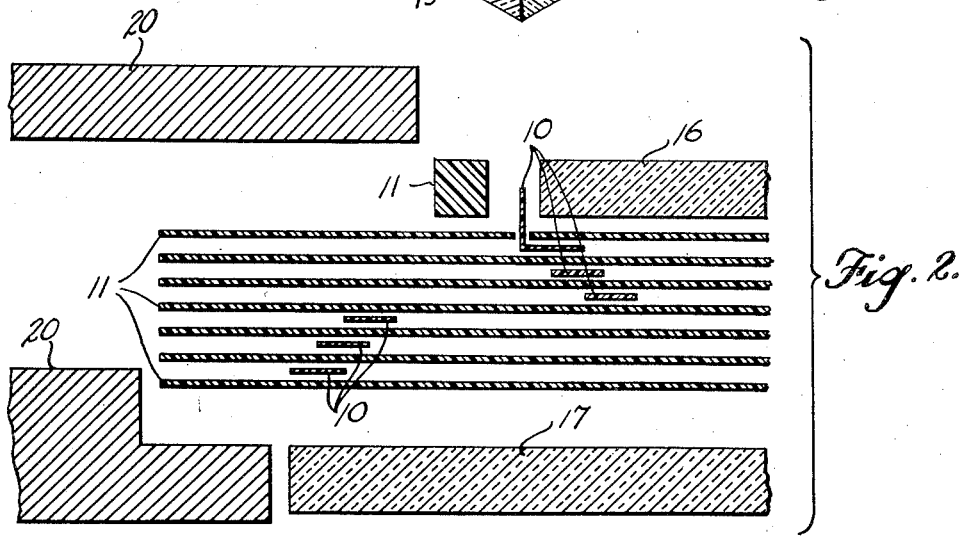
Figure 2 is a cross-sectional view of the component parts before being assembled in the manner shown in Figure 1.

More particularly, the invention comprises the placement of thin strips of a parting medium made of cellophane tape 10 between sheets of vinyl which compose the vinyl layer 11 in locations near the boundaries 12 and 13 of the respective glass-to-vinyl bond surfaces 14 and 15.

The drawing illustrates the placement of parting media 10 within the vinyl layer 11 between alternate sheets of vinyl and arranged parallel to and adjacent to the peripheries of the glass panes 16 and 17. The successive strips 10 are staggered, with those nearest the glass surfaces 14 and 15 located adjacent to the boundaries 12 and 13 and the other inner strips overlying each other but placed successively away from the boundaries 12 and 13 and closer to the center of the vinyl layer 11. The strips, in the sectional view, roughly define two tapering portions 18 and 19 of the vinyl layer 11.

When the invention is incorporated into a standard windshield panel 20 and conventionally mounted in a framed opening 21, the exposure of the final assembly to very low temperatures no longer results in edge chipping of the glass. The addition of the tape strips 10 in the inventive manner results in a gradual deformation of vinyl which increases in the tapering portions 18 and 19 as the boundaries 12 and 13 of respective glass-to-vinyl bond surfaces 14 and 15 are approached. The maximum boundary deformation absorbs the formerly critical stress energy created by the excessive contraction of the vinyl layer 11 and thereby counteracts the chipping tendencies.

The spacing of the strips 10 in staggered layers in addition to permitting the gradual deformation as described still maintains continuity in the vinyl in a direction parallel to the surfaces of the windshield. This continuity provides the vinyl strength that is required to hold the windshield unit in the frame mounting when it is subjected to abnormal forces, such as those that occur upon the failure of the glass.

The potential strength of the vinyl is not destroyed by undesirable delamination for the recesses that tend to develop acquire round surfaces that retard their continued expansion.

Although the parting media 10 has been referred to as cellophane tape, other materials which will not bond with or react with the vinyl interlayer could be used.

Having now particularly described and ascertained the nature of my invention, and in what manner the same is to be performed, I declare that what I claim is:

1. An edge construction for a laminated glass-vinyl windshield comprising the laminated layers of glass and vinyl with the exterior of their composite edge surfaces conventionally formed to fit a complementary window frame, and thin strips of a parting medium built into the windshield between sheets of the vinyl that compose the inner layer of the laminated glass, the said thin strips are arranged parallel to and adjacent to the peripheries of the outer glass panes with the successive strips staggered from the peripheries of the said outer glass panes, each succeeding overlapping strip being spaced closer to the center of the vinyl layer to establish tapering portions of the vinyl layer that deform absorbing critical stresses that otherwise would cause the glass to chip upon the excessive contraction of the vinyl layer at low temperatures.

2. A laminated glass-vinyl windshield for conventional installation in aircraft comprising outer glass panes, an inner vinyl layer composed of sheets of vinyl and thin strips of a parting medium tape moulded between the vinyl sheets, the said thin strips are arranged parallel to and adjacent to the peripheries of the said outer glass panes with the successive strips staggered so each succeeding overlapping strip is spaced closer to the center of the vinyl layer thereby creating tapering portions which deform absorbing critical stresses that otherwise would cause glass chipping as the vinyl layer contracts excessively at low temperatures.

3. A laminated glass-vinyl windshield for conventional installation in aircraft to avoid glass chipping at low temperatures upon the excessive contraction of the vinyl relative to glass, comprising outer glass panes, an inner vinyl layer composed of sheets of vinyl, and thin strips of a parting medium inserted near the edges of the vinyl and interlaid between the said vinyl sheets in a staggered overlapping relationship from each surface toward the center of the vinyl layer near the glass edges forming two respective tapering portions of the vinyl layer which deform to absorb the critical thermal stresses.

4. An edge construction for the arrangement of a laminated glass-vinyl window in an aircraft to avoid glass chipping tendencies caused by the excessive contraction of the vinyl layer at low temperatures, comprising a frame receiving channel of unequal sides attached to the aircraft, a laminated window to interfit with the receiving channel, the inner layer of the said window composed of thin sheets of vinyl, the outer edge of the said inner layer formed with a spaced abutting shoulder so the said edge projects into the said receiving channel with the said shoulder resting on the long side of the said channel, an inner pane of glass contained within the surrounding edges of the short side of the receiving channel adjacent to the said vinyl inner layer, an outer pane of glass contained within the surrounding abutting shoulder of the vinyl layer and adjacent the vinyl layer, a thin strip of a parting medium tape between the said abutting shoulder and the said outer pane of glass, and additional thin strips of a parting medium tape incorporated into the window between sheets of the said vinyl inner layer, the said additional strips arranged parallel to and adjacent to the peripheries of the outer glass panes with successive strips staggered from the peripheries of the said glass panes, each succeeding overlapping strip being spaced closer to the center of the vinyl layer to establish tapering portions of the vinyl layer adjacent the glass pane boundaries which deform absorbing critical stresses that otherwise would cause glass chipping as the vinyl layer contracts excessively at low temperatures.

WILLIAM K. BLEDSOE.

References Cited in the file of this patent

UNITED STATES PATENTS

| Number | Name | Date |
|---|---|---|
| 1,751,051 | Nobbe | Mar. 18, 1930 |
| 2,303,151 | Watkins | Nov. 29, 1942 |
| 2,567,353 | Ryan | Sept. 11, 1951 |